(12) United States Patent
Wolinska (10) Patent No.: US 11,905,501 B2
(45) Date of Patent: Feb. 20, 2024

(54) HOP PRODUCTS

(71) Applicant: BARTH INNOVATIONS LIMITED, Paddock Wood (GB)

(72) Inventor: Katarzyna Wolinska, Paddock Wood (GB)

(73) Assignee: BARTH INNOVATIONS LIMITED, Paddock Wood (GB)

( * ) Notice: Subject to any disclaimer, the term of this patent is extended or adjusted under 35 U.S.C. 154(b) by 798 days.

(21) Appl. No.: 16/342,956

(22) PCT Filed: Oct. 19, 2017

(86) PCT No.: PCT/EP2017/076788
§ 371 (c)(1),
(2) Date: Apr. 17, 2019

(87) PCT Pub. No.: WO2018/073384
PCT Pub. Date: Apr. 26, 2018

(65) Prior Publication Data
US 2020/0048590 A1  Feb. 13, 2020

(30) Foreign Application Priority Data
Oct. 19, 2016 (GB) .................... 1617691

(51) Int. Cl.
*C12C 3/10* (2006.01)
*C12C 5/02* (2006.01)

(52) U.S. Cl.
CPC .............. *C12C 3/10* (2013.01); *C12C 5/026* (2013.01)

(58) Field of Classification Search
CPC .............. C12C 3/10; C12C 3/08; C12C 5/026
See application file for complete search history.

(56) References Cited

U.S. PATENT DOCUMENTS 5,750,179 A * 5/1998 Guzinski .................. C12C 3/10
426/520
2003/0138546 A1 7/2003 Goldstein et al.
2014/0072691 A1 3/2014 Scheller et al.

FOREIGN PATENT DOCUMENTS

GB 459 635 A 1/1937
GB 1 048 912 A 11/1966
(Continued)

OTHER PUBLICATIONS

International Search Report and Written Opinion of the International Searching Authority of PCT/EP2017/076788 dated Apr. 5, 2018, 15 pages.
(Continued)

*Primary Examiner* — Vera Stulii
(74) *Attorney, Agent, or Firm* — Squire Patton Boggs (US) LLP (57) ABSTRACT

The present invention relates to hop products, in particular to hop products for flavouring beer and enhancing the aroma of beers, ales and other brewed beverages. More specifically, the present invention relates to such products which are 100% hop-derived and which are readily dispersible in cold wort and beer. As a result of our research, we have determined that polar hop extracts, in particular aqueous extracts of hops, have emulsifying properties for hop oil or hop oil-based hop extract products. This has allowed us to develop hop flavouring and aroma products for beer consisting solely of natural products, without the need for artificial emulsifiers and thickening agents or solvents. Surprisingly and unexpectedly, we have found that our combinations of hop-derived constituents is readily dispersible in cold wort and in beer, even when formulated as a 100% hop-derived paste, and provides excellent hop flavour and aroma to the finished beer. Accordingly, the present inven- (Continued)

Microscopic images of pastes produced with boiling water extract (BWE) at various water contents; 1000x and 100x magnification tion provides a hop composition comprising a mixture of a polar extract of hops and a hop oil-containing component.

15 Claims, 6 Drawing Sheets

(56) References Cited

FOREIGN PATENT DOCUMENTS

| GB | 1071867 A | * | 6/1967 | ............... C12C 3/12 |
| GB | 2 293178 A | | 3/1996 | |
| WO | WO 93/15181 A1 | | 8/1993 | |

OTHER PUBLICATIONS

Combined Search and Examination Report of the GB Intellectual Property Office for GB1617691.9 dated Jul. 3, 2017, 9 pages.

\* cited by examiner

Figure 1: Microscopic images of pastes produced with boiling water extract (BWE) at various water contents; 1000x and 100x magnification Figure 2: GC-MS areas for selected compounds of interest in beers dry-hopped with paste at different stages of the brewing process. FV – fermentation vessel; MV – maturation vessel; unf – unfiltered.

Figure 3: Comparison of analytical results for the two utilisation trials (dry hopping with paste vs pellets).

Figure 4

| \multicolumn{5}{c}{PASTE QUALITY VS BETA-ACID CONTENT} |
|---|---|---|---|---|
| SAMPLE | Beta-acid Content in Paste [%] | Paste Texture immediately after mixing | Stability [First 24 hours] | Dispersibility in Water |
| \multicolumn{5}{c}{Temperature = 20°C} |
| 1 | 39.9 | Smooth | Separation, Crystals | Average |
| 2 | 34.4 | Smooth | Separation, Crystals | Poor |
| 3 | 31.6 | Smooth | Separation, Crystals | Average |
| 4 | 28.7 | Smooth | Separation, Crystals | Poor |
| 5 | 22.7 | Smooth | Separation, Crystals | Average |
| 6 | 16.1 | Smooth | Separation, Crystals | Excellent |
| \multicolumn{5}{c}{Temperature = 40°C} |
| 1 | 39.9 | Smooth | Slight Separation, Crystals | Excellent (some mini waxy lumps on top) |
| 2 | 34.4 | Smooth | Slight Separation, Crystals | Excellent (some mini waxy lumps on top) |
| 3 | 31.6 | Smooth | Slight Separation, Crystals | Excellent |
| 4 | 28.7 | Smooth | Slight Separation, some Crystals | Excellent |
| 5 | 22.7 | Smooth | Stable, some Crystals | Excellent |
| 6 | 16.1 | Smooth | Stable | Excellent |

*Paste Quality Depending on β-Acid Content*

Poor – did not disperse at all
Average – some waxy lumps noticed
Excellent – disperse completely

*Figure 5*

| Sample | Sensory Evaluation |
|---|---|
| Target CO$_2$ Paste | |
| ORE Target Paste; Start of Fermentation | Floral, Fruity, complex, balanced, |
| ORE Target Paste; Start of Maturation | Balanced, bitter, hoppy |
| ORE Target Paste; End of Maturation | Balanced, hoppy, fruity, complex, resinous |
| Target Pellets | |
| Target Pellets; Start of Fermentation | Intense hoppy, vegetal, very bitter, toffee, oat-like, some paper notes |
| Target Pellets; Start of Maturation | Intense hoppy, vegetal, very bitter, toffee, oat-like, some paper notes |
| Target Pellets; End of Maturation | Intense hoppy, vegetal, very bitter, toffee, oat-like, some paper notes |

*Figure 6*

| Sample | Tasting Results/ Flavour |
|---|---|
| Dose rate: 14 ppm | |
| ORE Citra Paste; Start of Fermentation | Fruity, complex, balanced, passion fruit, peach-like; Preferred |
| ORE Citra Paste; Start of Maturation | Fruity, hoppy, herbal (less fruity than when added at the start of fermentation) |
| Dose rate: 28 ppm | |
| ORE Citra Paste; Start of Fermentation | Hoppy, herbal, little fruity |
| ORE Citra Paste; Start of Maturation | Very intense, balanced, fruity, hoppy, herbal, dry-hopping like; Preferred |

*Figure 7*

HOP PRODUCTS

CROSS-REFERENCE TO RELATED APPLICATIONS

This application is a National Stage filing under 35 U.S.C. § 371 of International Patent Application No. PCT/EP2017/076788, filed Oct. 19, 2017, and entitled "HOP PRODUCTS," which claims the benefit of priority to GB Application No. 1617691.9, filed Oct. 19, 2016, both applications of which are herein incorporated by reference in their entirety for all purposes.

FIELD

The present invention relates to hop products, in particular to hop products for flavouring beer and enhancing the aroma of beers, ales and other brewed beverages. More specifically, the present invention relates to such products which are 100% hop-derived and which are readily dispersible in cold wort and beer.

BACKGROUND

In order to enhance the flavour and aroma of beer, a range of hop-oil or hop oil-containing extracts can be added. Hop oil and hop oil-containing extracts are mixtures of non-polar compounds and, because of this, do not dissolve very readily in aqueous-based solutions such as beer or wort, especially when cold. In order to aid dissolution in beer, hop oil can be formulated in a number of ways including the use of a carrier solvent such as propylene glycol or ethanol; alternatively, the oil can be suspended as fine droplets in the form of aqueous emulsions. Addition to the hot wort can aid dispersion and solubility but the valuable volatile aroma compounds will be lost to some degree. Other formulations also used include hop oil being suspended on an inert solid support such as silica.

Products currently available on the market include hop oils, or hop oil fractions dissolved in propylene glycol (propane-1,2-diol, PG) or ethanol; or conventional hop-based emulsions.

Although the use of propylene glycol is permitted in food systems (in beer up to 0.1%) and it is a chemically inert substance, it is synthetic. ethanol, although a natural product, has several issues including its flammability, leading to high transport costs and safety concerns. The addition of ethanol into beer is not liked by brewers, who have a preference that all alcohol in the beer is derived from the brewing process; and, unlike propylene glycol, ethanol can interact with components in hop oil chemically, to change flavour. Consequently, of these two, currently propylene glycol is the favoured carrier solvent.

Conventional hop oil or hop oil-containing extract-based emulsions have been used in the brewing industry for many years. This type of product, however, contains natural but non-hop derived ingredients (e.g. Xanthan gum, starch) and synthetic food grade emulsifiers, such as polysorbate 80. Although use of these emulsions offers significant advantages over more traditional practices, such as dry hopping (speedier processing and reduced beer losses), the flavours imparted tend to be less complex and balanced more towards aroma, rather than taste.

There is therefore a need for a hop oil or hop oil-containing extract product which provides an improved and more complex hop flavour, which is readily dispersible in beer and which is prepared from wholly natural products. We have sought to develop a product which is derived solely from hops.

SUMMARY OF THE INVENTION

As a result of our research, we have determined that polar hop extracts, in particular aqueous extracts of hops, have emulsifying properties for hop oil or hop oil-based hop extract products. This has allowed us to develop hop flavouring and aroma products for beer consisting solely of natural products, without the need for artificial emulsifiers and thickening agents or solvents. Surprisingly and unexpectedly, we have found that our combinations of hop-derived constituents are readily dispersible in cold wort and in beer, even when formulated as a 100% hop-derived paste, and provide excellent hop flavour and aroma to the finished beer.

The polar extracts can be obtained by extraction with cold, hot or boiling water of whole hops, hop pellets or spent hops (such as following a $CO_2$ extraction process to extract hop oil), or with other food-grade acceptable solvents, such as aqueous solvents of lower alcohols, such as ethanol.

The hop oil or hop oil-containing extract can be a $CO_2$ extract (typically from a liquid (subcritical) $CO_2$ extraction or supercritical $CO_2$ extraction), an oil-enriched $CO_2$ extract or distilled hop oils (obtained by molecular, steam or hydro distillation).

Accordingly, in its broadest sense, the present invention provides a hop composition comprising a mixture of a polar extract of hops and a hop oil-containing component.

Preferably, the polar extract of hops is an aqueous extract of hops.

More specifically, the present invention provides a hop composition comprising a mixture of an aqueous extract of hops having a water content of 55 wt % or lower and a hop oil-containing component.

Preferably, the extract of hops is prepared by extracting hops or by extracting spent hops.

Preferably, the extract of hops is obtainable by extracting hops or spent hops with water, preferably with hot water, optionally with boiling water. Alternatively, the extract of hops is a de-solventised extract obtainable from an ethanolic hop extraction process.

Preferably, the hop oil-containing component is a mixture of hop oils or an oil-rich extract of hops.

Preferably, the polar or aqueous extract of hops and the hop oil-containing component are in a ratio of at least 1:1, preferably at least 3:2, more preferably about 7:3.

Preferably, the water content of the polar or aqueous extract of hops is 50% w/w or less, preferably 40% w/w or less; more preferably between 20% w/w and 40% w/w; even more preferably between 25% w/w and 35% w/w.

The present invention further provides an emulsion comprising a composition as defined above and further comprising water, preferably in an amount of up to about 99.8% w/w.

Suitably, the composition has a hop oil content of 5% by weight or less.

The present invention also provides the use of a polar extract of hops as an emulsifier for a non-polar extract of hops.

More generally, the present invention also provides the use of a polar extract of hops as an emulsifier for non-hop oils, preferably natural or synthetic essential oils.

Preferably, the polar extract of hops is an aqueous extract of hops.

Preferably, the water content of the polar or aqueous extract of hops is 55% w/w or less, preferably 50% w/w or less, more preferably 40% w/w or less; even more preferably between 20% w/w and 40% w/w; most preferably between 25% w/w and 35% w/w.

Preferably, the extract of hops is prepared by extracting hops or by extracting spent hops.

Preferably, the extract of hops is obtainable by extracting hops or spent hops with water, preferably with hot water, optionally with boiling water. Alternatively, the extract of hops is a de-solventised extract obtainable from an ethanolic hop extraction process.

Typically, the non-polar extract of hops is a mixture of hop oils or a hop oil-containing component, preferably an oil-rich extract of hops.

Preferably, the polar or aqueous extract of hops and the hop oil or hop oil-containing component are emulsified in a ratio of at least 1:1, preferably at least 3:2, more preferably about 7:3.

In a yet further aspect, the present invention also provides the use of a polar extract of hops as a foam enhancing agent in the brewing of beer.

In a modification of this aspect, the present invention also provides the use of a composition as defined above comprising a polar extract of hops and a non-polar extract of hops as a foam enhancing agent in the brewing of beer.

The present invention further provides a method of enhancing foam characteristics in a beer, the method comprising the addition of a composition as defined above prior to or at the stage of fermentation of the beer.

The present invention further provides a method of preparing a hop-flavouring composition, the method comprising the steps of preparing a polar extract of hops having a water content of 55 wt % or lower and preparing a hop oil-containing component; and mixing the polar extract and the hop oil-containing component together.

Preferably, the polar extract of hops is an aqueous extract of hops.

Preferably, the extract of hops is prepared by extracting hops or by extracting spent hops.

Preferably, the extract of hops is obtainable by extracting hops or spent hops with water, preferably with hot water, optionally with boiling water. Alternatively, the extract of hops is a de-solventised extract obtainable from an ethanolic hop extraction process.

Preferably, the hop oil-containing component is a mixture of hop oils or an oil-rich extract of hops.

Preferably, the polar or aqueous extract of hops and the hop oil-containing component are in a ratio of at least 1:1, preferably at least 3:2, more preferably about 7:3.

Preferably, the water content of the polar or aqueous extract of hops is 50% w/w or less, preferably 40% w/w or less; more preferably between 20% w/w and 40% w/w; even more preferably between 25% w/w and 35% w/w.

Preferably, the step of mixing is carried out at a temperature of 20° C. or more, preferably above about 35° C.

Optionally, the method further comprises a step of adding water to mixture of the polar extract and the hop oil-containing component to give a final water content of up to about 99.8% w/w.

The above and other aspects of the present invention will now be described in further detail, by way of example only, with reference to the following examples.

DETAILED DESCRIPTION

Broadly speaking, the present invention combines (i) a polar extract obtained by aqueous extraction of hops or spent hops with (ii) hop oil-containing component, as the hop flavouring and hop aroma component. The combination may, for example, be formulated as a binary paste or formed as an aqueous emulsion. In some variants, additional components may be added, such as thickening agents, for example xanthan gum.

Surprisingly and unexpectedly, we have found that such a combination of hop-derived constituents provides excellent flavouring and is readily dispersible in beer, even when formulated as a paste.

The hop oil-containing component can be any conventional flavour or aroma-providing hop extract as would be used by a brewer. For example, the component can be the product of any conventional process, such as $CO_2$ or ethanol extraction, and may be followed by distillation or a combination of processes. The hop oil-containing component may essentially be a substantially pure mixture of hop oils or an extract containing hop oils, which may be a concentrated extract of hop oils.

In the following examples, we will describe the preparation of our hop compositions formulated, initially, as emulsions followed by formulation as pastes. We will then describe the results of various brewing trials with a range of hop varieties, from which it will be appreciated that the compositions of the present invention provide true-to-type hop flavouring and aroma with compositions that are readily dispersible both in actively fermenting beer, as the cold wort, or in beer itself.

Throughout the description which follows percentages are given as by weight (w/w) unless otherwise stated or unless the context indicates otherwise. The term HWE is an abbreviation of Hot Water Extract, which indicates a polar extract obtainable by an extraction of hops or spent hops using hot water. Hot water extracts of hops are commercially available or can be prepared in accordance with the examples which follow. The term ORE is an abbreviation of Oil-Rich Extract and refers to non-polar extracts of hops which are high in available hop essential oils. Such extracts are available commercially.

The term beer is used in this application in its broadest sense of encompassing all styles of beer, namely a beverage brewed, most usually, from cereal grains such as barley, wheat, maize or corn, although other ingredients are used in other traditional beers around the world. The present invention is concerned with adding hop flavour and aroma to any product to which it is desired to add or enhance hop flavour or aroma.

I—Hop Emulsions

Reagents:
1. All hop pellets, spent hops, oil-rich $CO_2$ extracts and hop oils commercially available from Barth-Haas UK Limited
2. Xanthan-Gum
3. Emulsifier (AdmulT80K)
4. Deionised water In the first group of examples, we compared a standard emulsion prepared using a hop oil rich $CO_2$ extract (ORE) emulsified in water using a conventional emulsifier, polyoxyethylene sorbitan monooleate, (AdmulT80K), against emulsions of the invention. Both types of emulsion were thickened using Xanthan gum a natural ingredient obtainable through bacterial fermentation.

Comparative Example 1

A standard emulsion was prepared, using a standard emulsification method, from the following ingredients:
2 g $CO_2$ extract
0.4 g Xanthan-Gum
0.5 g Emulsifier
100 ml Water 100 ml of water was poured into a beaker (250 ml) and heated up to 50° C. on a magnetic stirrer hot plate. 0.4 g of Xanthan gum was added into the water and dispersed by stirring the mixture for 20 min at 50° C. In a separate beaker (50 ml) 0.5 g of emulsifier and 2 g of ORE were mixed together with gentle stirring at 40° C. on a hot plate. When fully mixed the extract/emulsifier mixture was slowly added to the aqueous xanthan gum dispersion and homogenised at 50° C. for 2 min at 4000 rpm using a Ultra-Turrex IKA T25 stirrer. The prepared emulsion was slightly yellow with a milk-like appearance and texture.

Inventive Example 1

Water Extract (Cold) of Spent Hops (not Concentrated)
Aqueous Extract Preparation:
10 g of Citra spent hops and 200 ml of water (20° C.) were placed into a 300 ml Duran bottle and then shaken (Stuart Scientific Shaker) for 30 min at 600 rpm. Collected extract including residue was transferred into the centrifugation bottle and centrifuged at 3000 rpm for 30 min (Thermo Scientific, Megafuge16). The supernatant (155 ml) was decanted from the solid mass and collected.

Inventive Emulsion Preparation:
Following the same emulsification procedure as described in Comparative Example 1, 100 ml of the polar extract was poured into a beaker (250 ml) and heated up to 50° C. on a magnetic stirrer hot plate. 0.4 g of Xanthan gum was added into the water and dispersed by stirring the mixture for 20 min at 50° C. ORE (2 g) was added slowly to the aqueous xanthan gum dispersion and homogenised at 50° C. for 2 min at 4000 rpm using a Ultra-Turrex IKA T25 stirrer.

Inventive Example 2

50° C. Water Extract of Spent Hops (not Concentrated)
Aqueous Extract Preparation:
10 g of Citra spent hops and 200 ml of water (50° C.) were placed into a 300 ml Duran bottle and then shaken (Stuart Scientific Shaker) for 30 min at 600 rpm. The collected extract including residue was transferred into the centrifugation bottle and centrifuged at 3000 rpm for 30 min (Thermo Scientific, Megafuge16). The supernatant (150 ml) was decanted from the solid mass and collected and allowed to cool.

Inventive Emulsion Preparation:
The inventive emulsion was prepared using the same emulsification method as Inventive Example 1.

Inventive Example 3

Boiling Water Extract of Spent Hops (not Concentrated)
Aqueous Extract Preparation:
10 g of Citra spent hops and 200 ml of water (at ambient temperature) were placed into the round bottom flask and boiled for 30 min. The round bottom flask was covered with a lid which was attached to the condenser (circulation). After 30 min of boiling the whole system was cooled down. Next, collected extract including residue was transferred into the centrifugation bottle and centrifuged at 3000 rpm for 1 hour (Thermo Scientific, Megafuge16). The supernatant (148 ml) was decanted from the solid mass, collected and allowed to cool.

Inventive Emulsion Preparation:
The inventive emulsion was prepared using the same emulsification method as Inventive Example 1.

Comparative Example 2

70% v/v Acetone Extract of Spent Hops (not Concentrated/Aqueous Solution)
Aqueous Extract Preparation:
100 g of Target spent hops and 1000 ml of 70% acetone (v/v in water) were placed into the 2 L beaker then stirred using overhead stirrer for 1 hour. Collected extract was filtered using a filter paper (Whatman no. 1). Next, acetone was removed using a rotary evaporator (BUCHI) under reduced pressure. The concentrated extract (without acetone but still including water) was placed into the fridge overnight, then again filtered using a filter paper (Whatman no. 6).

Emulsion Preparation:
The emulsion was prepared using the same emulsification method as Inventive Example 1. Unlike with the other aqueous extracts described above, we were unable to form an emulsion with this aqueous acetone extract.

The resultant compositions were then assessed for stability as an emulsion. The results are shown in Table 1 below.

TABLE 1

Influence of solvent and raw material on
Emulsion stability (un-concentrated extracts)

|  | Aqueous Extraction Solvent | Emulsifier Source Material | Emulsion stability |
|---|---|---|---|
| Comparative Example 1 | Not applicable | Emulsifier (AdmulT80K) | Excellent |
| Inventive Example 1 | Cold Water | spent hops | Excellent |
| Inventive Example 2 | 50° C. Water | spent hops | Excellent |
| Inventive Example 3 | Boiling Water | spent hops | Excellent |
| Comparative Example 2 | 70% Acetone | spent hops | Poor |

Emulsion Stability Assessment Definitions:
Excellent—smooth, milk-like, emulsion, no separation
Poor—rapid separation, two phases.

It is noticeable that the aqueous acetone extract failed to provide satisfactory emulsifying properties. It is known that extraction of botanicals with aqueous acetone can cause denaturing of proteins. Accordingly, our result may tend to indicate that the active emulsifying component of the aqueous extracts of the present invention may be associated with proteins in the hops.

We then carried out further trials using concentrated aqueous extracts of spent hops/hops to form emulsions.

Inventive Example 4

Boiling Water Extract of Spent Hops (Concentrated)
Aqueous Extract Preparation:
150 g of Citra spent hops and 2000 ml of water were placed into a round bottom flask and boiled for 1 hour under reflux. After 30 min of boiling the mixture was allowed to cool to approx. 30° C. Collected extract including residue was transferred into a centrifugation bottle and centrifuged at 3000 rpm for 30 min (Thermo Scientific, Megafuge16). The supernatant (1700 ml) was decanted from the solid mass and then concentrated using a rotary evaporator at 70° C. (BUCHI) under reduced pressure, until obtaining mustard paste-like consistency (35 g).

Inventive Emulsion Preparation:
The inventive emulsion was prepared using the same emulsification method as Inventive Example 1, except using 4 g of concentrate aqueous extract and making up to 100 ml with distilled water.

Inventive Example 5

Boiling Water Extract of Hop Pellets (Concentrated)
Aqueous Extract Preparation:
150 g of Citra hop pellets and 2000 ml of water were placed into a round bottom flask and boiled for 1 hour under reflux. After boiling the mixture was allowed to cool to approx. 30° C. Next, collected extract including residue was transferred into a centrifugation bottle and centrifuged at 3000 rpm for 30 min (Thermo Scientific, Megafuge16). The supernatant (1650 ml) was decanted from the solid mass and then concentrated using a rotary evaporator at 70° C. (BUCHI) under reduced pressure, until a mustard paste-like consistency was obtained (41 g).

Inventive Emulsion Preparation:
The inventive emulsion was prepared using the same emulsification method as Inventive Example 1, except using 4 g of concentrate aqueous extract and making up to 100 ml with distilled water.

Inventive Example 6

96% v/v Ethanol Extract of Spent Hops (Concentrated)
Aqueous Extract Preparation:
10 g of Citra spent hops and 200 ml of 96% v/v ethanol (in water) were placed into a 300 ml Duran bottle and shaken (Stuart Scientific Shaker) for 30 min at 600 rpm. The collected extract including the residue was transferred into the centrifugation bottle and centrifuged at 3000 rpm for 30 min (Thermo Scientific, Megafuge16). The supernatant was decanted from the solid mass, collected and then concentrated using a rotary evaporator at 70° C. (BUCHI) under reduced pressure, until dry (1.8 g).

Inventive Emulsion Preparation:
The inventive emulsion was prepared using the same emulsification method as Inventive Example 1, except using 0.9 g and 0.5 g of concentrate aqueous extract (Inventive Emulsions 6a and 6b respectively) and making each up to 100 ml with distilled water.

Inventive Example 7

4% v/v Ethanol Extract of Spent Hops (Partially Concentrated)
10 g of Citra spent hops and 200 ml of 4% v/v ethanol (the balance being water) were placed into a 300 ml Duran bottle and shaken (Stuart Scientific Shaker) for 30 min at 600 rpm. The extract including the residue was transferred into a centrifugation bottle and centrifuged at 3000 rpm for 30 min (Thermo Scientific, Megafuge16). Due to excessive foaming the evaporation was stopped before achieving dryness, hence experiments 7a-7d, using various ratios of the aqueous concentrate (of unknown activity level).

The supernatant was separated from the solid mass, collected and concentrated using a rotary evaporator at 40° C. (BUCHI) to give a 60 g of extract (including water). The extract was then used to make four emulsions in the following proportions:

Inventive Example 7a—Emulsion with 4% Ethanol Extract of Spent Hops (100 ml)

2 g $CO_2$ extract (ORE; 13% oil)
0.4 g Xanthan-Gum
10 g de-alcoholised extract with 4% ethanol extract of spent hops
90 g Water Inventive Example 7b—Emulsion with 4% Ethanol Extract of Spent Hops (100 ml)

2 g $CO_2$ extract (ORE; 13% oil)
0.4 g Xanthan-Gum
20 g de-alcoholised extract with 4% ethanol extract of spent hops
80 g Water Inventive Example 7c—Emulsion with 4% Ethanol Extract of Spent Hops (100 ml)

2 g $CO_2$ extract (ORE; 13% oil)
10 g Xanthan-Gum
30 g de-alcoholised extract with 4% ethanol extract of spent hops
70 g Water

Inventive Example 7d—Emulsion with 4% Ethanol Extract of Spent Hops (100 ml)

2 g $CO_2$ extract (ORE; 13% oil)
0.4 g Xanthan-Gum
60 g de-alcoholised extract with 4% ethanol extract of spent hops
40 g Water Four emulsions were prepared for comparison because, as will be appreciated, the precise composition of the ethanol extract is unknown. The emulsions were tested for stability and the results are shown in Table 2 below.

TABLE 2

Influence of solvent and raw material on Emulsion stability (concentrated extracts)

| | Polar Extract Solvent | Polar Extract Source Material | Emulsion Stability |
|---|---|---|---|
| Inventive Example 4 | boiling water | spent hops | Excellent |
| Inventive Example 5 | boiling water | hop pellets | Excellent |
| Inventive Example 6a | 96% ethanol | spent hops | Excellent |
| Inventive Example 6b- | | | Excellent |
| Inventive Example 7a | 4% ethanol | spent hops | Excellent |
| Inventive Example 7b | | | Excellent |
| Inventive Example 7c | | | Excellent |
| Inventive Example 7d | | | Good |

Emulsion Stability Assessment Definitions:
Excellent—smooth, milk-like, emulsion, no separation
Good—milk like with some waxy particle evident, no separation
Poor—separation, two phases Flavour Evaluation A flavour evaluation of inventive emulsions in comparison with standard emulsion and traditional dry hopping with hop pellets was carried out. Samples of a commercial beer were treated with 6 different hop products in order to evaluate differences and/or similarities:

1. A Standard Emulsion (Comparative Example 1)
2. Hop Pellets T90 (a conventionally dry-hopped beer)
3. Emulsion formulated with Cold Water Extract (Inventive Example 1)
4. Emulsion formulated with 96% ethanol Water Extract (Inventive Example 6)
5. Emulsion formulated with 4% ethanol Water Extract (Inventive Example 7b)
6. Emulsion formulated with Hot Water Extract) (Inventive Example 2)

Figure 4:
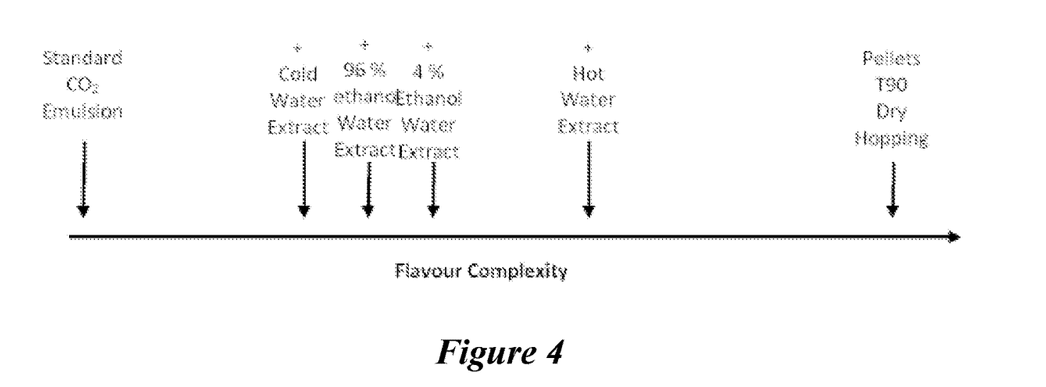
FIG. 4 is a chart showing the ranking by six panelists of emulsion in terms of complexity of hop flavour on an arbitrary scale.

Six panellists were asked to describe the flavour of the samples and additionally, to rank the four inventive emulsions in terms of complexity of hop flavour on an arbitrary scale. The results are shown in FIG. 4. It will be seen that the standard emulsion falls at one end of the scale and conventional dry-hopped beer (T90 pellets) at the other with the selected inventive emulsions forming a cluster between the two.

It appeared that emulsion enhanced with a HOT water extract was the closest to dry hopped beer in terms of flavour and aroma. The two samples were not identical but were described as having a lot in common (mouthfeel, vegetal and hoppy notes, and complex bitterness). All of the inventive emulsions were considered to be improvements on the standard emulsion and closer to a traditional dry hopped flavour.

II—Hop Pastes

Further work showed, surprisingly, that our extracts can be formulated as simple, concentrated pastes which have excellent dispersibility in cold wort and beer and provide excellent hop flavours, without the need for an emulsifier such as AdmulT80K or thickening agent such as Xanthan gum. Pastes were prepared using a polar extract of spent hops/hops with a non-polar, hop-derived aroma fraction, for example, a $CO_2$ extract or hop oil obtained by distillation or hop oil fractions.

Inventive Example 8

Boiling Water Extract of Spent Hops (Concentrated)

The concentrated boiling water extract of spent Citra hops (aqueous extract preparation) obtained in Inventive Example 4 was mixed with the Citra oil rich $CO_2$ extract (ORE; 13% oil content) in a ratio of 60:40 w/w to form a paste (containing 5.2% oil). The paste was found to have a very good stability and was surprisingly easy to disperse in beer.

Inventive Example 9

Boiling Water Extract of Hop Pellets (Concentrated)

The concentrated boiling water extract of Citra hop pellets (aqueous extract preparation) obtained in Inventive Example 5 was mixed with the Citra oil rich $CO_2$ extract (ORE: 13% oil content) in a ratio of 60:40 w/w to form a paste (5.2% oil content). The paste was found to have a stability and dispersibility properties similar to Inventive Example 8.

Inventive Example 10

Different Compositions of Boiling Water Extract Concentrate and ORE

Pastes were prepared consisting of varying proportions (see table below) of an oil-rich $CO_2$ extract (ORE) from Target hops, containing 5.5% v/w oil as the hop oil-containing component with 1.5 g of the aqueous extract prepared in accordance with Inventive Example 4.

The mixtures were combined manually at ambient temperature. We found that it was not necessary to use a high shear mixer or elevated temperatures to ensure adequate mixing.

The ORE pastes were assessed for appearance, dispersibility in a commercial (finished) beer and flavour (taste and aroma) properties given to the beer. Dispersibility in beer was tested by placing a small amount of paste on a spatula and stirring into the beer for a few seconds and visually assessing what was left on the spatula and how evenly was the paste dispersed in the beer. Results are shown in Table 3 below.

TABLE 3

Influence of the Paste formulation, prepared from a Target ORE, on its appearance, ease of dispersion and flavour properties.

| Example | Formulation [g] Boiling water extract | Formulation [g] ORE | Oil in paste [%] | Appearance when stirred | Dispersibility in beer | Flavour properties | Paste stability |
|---|---|---|---|---|---|---|---|
| Inventive Example 10a | 1.50 | 0.50 | 1.38 | Smooth, mustard paste-like, mobile | Good | Positive, mild, delicate | Poor |
| Inventive Example 10b | 1.50 | 1.00 | 2.20 | Smooth, mustard paste-like | Excellent | Positive, balanced | Good |
| Inventive Example 10c | 1.50 | 1.50 | 2.75 | Smooth, mustard paste-like | Excellent | Sharp, resinous | Good |
| Inventive Example 10d | 1.50 | 1.75 | 3.00 | Smooth, more sticky, less mobile | Good | Sharp, resinous | Excellent |
| Inventive Example 10e | 1.50 | 2.00 | 3.15 | Smooth, sticky, ORE-like | Good | Sharp, resinous, burns | Good |

Definitions for Dispersibility in Beer:
Excellent—disperses totally leaving a clean spatula
Good—majority of paste disperses living a small amount of residue on a spatula
Poor—did not disperse at all
Definitions for Paste Stability:
Excellent—smooth, mustard-paste like, no phase separation
Good—mustard paste-like with some waxy particles, slight phase separation evident
Poor—separation, two phases Inventive Example 11

Different Compositions of Hot Water Extract Concentrate (HWE) and ORE

Pastes were prepared consisting of varying proportions (see table 4 below) of an oil-rich $CO_2$ extract (ORE) from Goldings hops, containing 10% v/w oil as the non-polar extract with 1.5 g of a commercially available hot water extract obtained from NATECO2 GmbH & Co KG.

The mixtures were combined manually at ambient temperature. Again, it was not necessary to use a high shear mixer or elevated temperatures to ensure adequate mixing.

The ORE pastes were assessed for appearance, dispersibility in a commercial (finished) beer and flavour (taste and aroma) properties given to the beer. Dispersibility in beer was tested by placing a small amount of paste on a spatula and stirring into the beer for a few seconds and visually assessing what was left on the spatula and how evenly was the paste dispersed in the beer. Results are shown in Table 4 below.

TABLE 4

Influence of the Paste formulation, prepared from a Goldings ORE (10%) and a concentrated hot water extract, on its appearance, ease of dispersion and flavour properties.

| Example | Formulation [g] HWE | Formulation [g] ORE | Oil in paste [%] | Appearance when stirred | Dispersibility in beer | Flavour properties | Paste stability |
|---|---|---|---|---|---|---|---|
| Inventive Example 11a | 1.50 | 0.10 | 0.63 | Smooth, mustard paste like | Poor | N/A | Poor |
| Inventive Example 11b | 1.50 | 0.50 | 2.50 | Smooth, mustard paste like | Poor | N/A | Poor |
| Inventive Example 11c | 1.50 | 0.75 | 3.33 | Smooth, mustard paste like | Poor | N/A | Poor |
| Inventive Example 11d | 1.50 | 1.00 | 4.00 | Smooth, more sticky, less mobile | Good | Sharp, hoppy, resinous, vegetal, | Poor |
| Inventive Example 11e | 1.50 | 1.25 | 4.55 | Smooth, mustard paste like | Excellent | Sharp, hoppy, resinous, vegetal | Poor |

TABLE 4-continued

Influence of the Paste formulation, prepared from a Goldings ORE (10%) and a concentrated hot water extract, on its appearance, ease of dispersion and flavour properties.

| Example | Formulation [g] HWE | Formulation [g] ORE | Oil in paste [%] | Appearance when stirred | Dispersibility in beer | Flavour properties | Paste stability |
|---|---|---|---|---|---|---|---|
| Inventive Example 11f | 1.50 | 1.5 | 5.00 | Smooth, mustard paste like | Excellent | Sharp, hoppy, resinous, vegetal | Poor |
| Inventive Example 11g | 1.50 | 1.75 | 5.38 | Smooth, mustard paste like | Excellent | Sharp, hoppy, resinous, vegetal | Excellent |
| Inventive Example 11h | 1.50 | 2.00 | 5.74 | Smooth, mustard paste like | Excellent | Sharp, hoppy, resinous, vegetal, burns | Excellent |
| Inventive Example 11i | 1.50 | 2.25 | 6.00 | Smooth, mustard paste like | Excellent | Sharp, hoppy, resinous, vegetal, burns | Excellent |
| Inventive Example 11j | 1.50 | 2.50 | 6.25 | Smooth, sticky, ORE-like | Poor | N/A | Excellent |
| Inventive Example 11k | 1.50 | 2.75 | 6.47 | Smooth, sticky, ORE-like | Poor | N/A | Excellent |
| Inventive Example 11l | 1.50 | 3.00 | 6.67 | Smooth, sticky, ORE-like | Poor | N/A | Excellent |

Definitions for Dispersibility in Beer:
Excellent—disperses totally leaving a clean spatula
Good—majority of paste disperses living a small amount of residue on a spatula
Poor—did not disperse at all
Definitions for Paste Stability:
Excellent—smooth, mustard-paste like, no phase separation
Good—mustard paste-like with some waxy particles, slight phase separation evident
Poor—separation, two phases These results suggest that dispersibility of the paste in the beer is dependent upon the ratio of non-polar extract to polar extract, whereas stability of the paste varies with oil content.

Inventive Example 12

Hop Oil Pastes

A series of hop oil pastes were prepared consisting of 1.5 g of the aqueous extract prepared in Example 4 and 0.25 g of Target hop oil to investigate the stability (at 19° C. over 10 days) and dispersibility in water of the hop oil paste. The results are shown in Table 5 below.

TABLE 5

Target Oil Paste stability

| | Oil Content [g] | Oil Content [% w/w] | Aqueous Extract Content [g] | Paste Stability | Paste Dispersibility in Water |
|---|---|---|---|---|---|
| Inventive Example 12a | 0.00 | 0.00 | 1.5 | Excellent | Excellent |
| Inventive Example 12b | 0.01 | 0.66 | 1.5 | Excellent | Excellent |
| Inventive Example 12c | 0.02 | 1.30 | 1.5 | Excellent | Excellent |
| Inventive Example 12d | 0.03 | 1.95 | 1.5 | Excellent | Excellent |
| Inventive Example 12e | 0.05 | 3.25 | 1.5 | Good | Good |
| Inventive Example 12f | 0.10 | 6.25 | 1.5 | Good | Good |
| Inventive Example 12g | 0.15 | 9.10 | 1.5 | Good | Good |
| Inventive Example 12h | 0.25 | 14.5 | 1.5 | Good | Good |
| Inventive Example 12i | 0.30 | 16.5 | 1.5 | Poor | Poor |
| Inventive Example 12j | 0.35 | 19.0 | 1.5 | Poor | Poor |
| Inventive Example 12k | 0.40 | 21.0 | 1.5 | Poor | Poor |
| Inventive Example 12l | 0.50 | 25.0 | 1.5 | Poor | Poor |
| Inventive Example 12m | 0.75 | 33.5 | 1.5 | Poor | Poor |
| Inventive Example 12n | 1.00 | 66.5 | 1.5 | Poor | Poor |
| Inventive Example 12o | 1.25 | 45.5 | 1.5 | Poor | Poor |
| Inventive Example 12p | 1.50 | 50.0 | 1.5 | Poor | Poor |

Definitions for Paste Stability:
Excellent—smooth, mustard-paste like, no phase separation
Good—mustard paste-like with some waxy particles, slight phase separation evident
Poor—separation, two phases
Definitions for Dispersibility in Beer:
Excellent—disperses totally leaving a clean spatula
Good—majority of paste disperses living a small amount of residue on a spatula
Poor—did not disperse at all As can been seen from these results, the aqueous hop extracts of the present invention are capable of providing stable pastes having good or excellent dispersibility in water at hop oil contents as least to as high an oil content as 14.5% w/w.

Inventive Example 13

β-Acid Content of the ORE and Paste Stability

Figure 5:
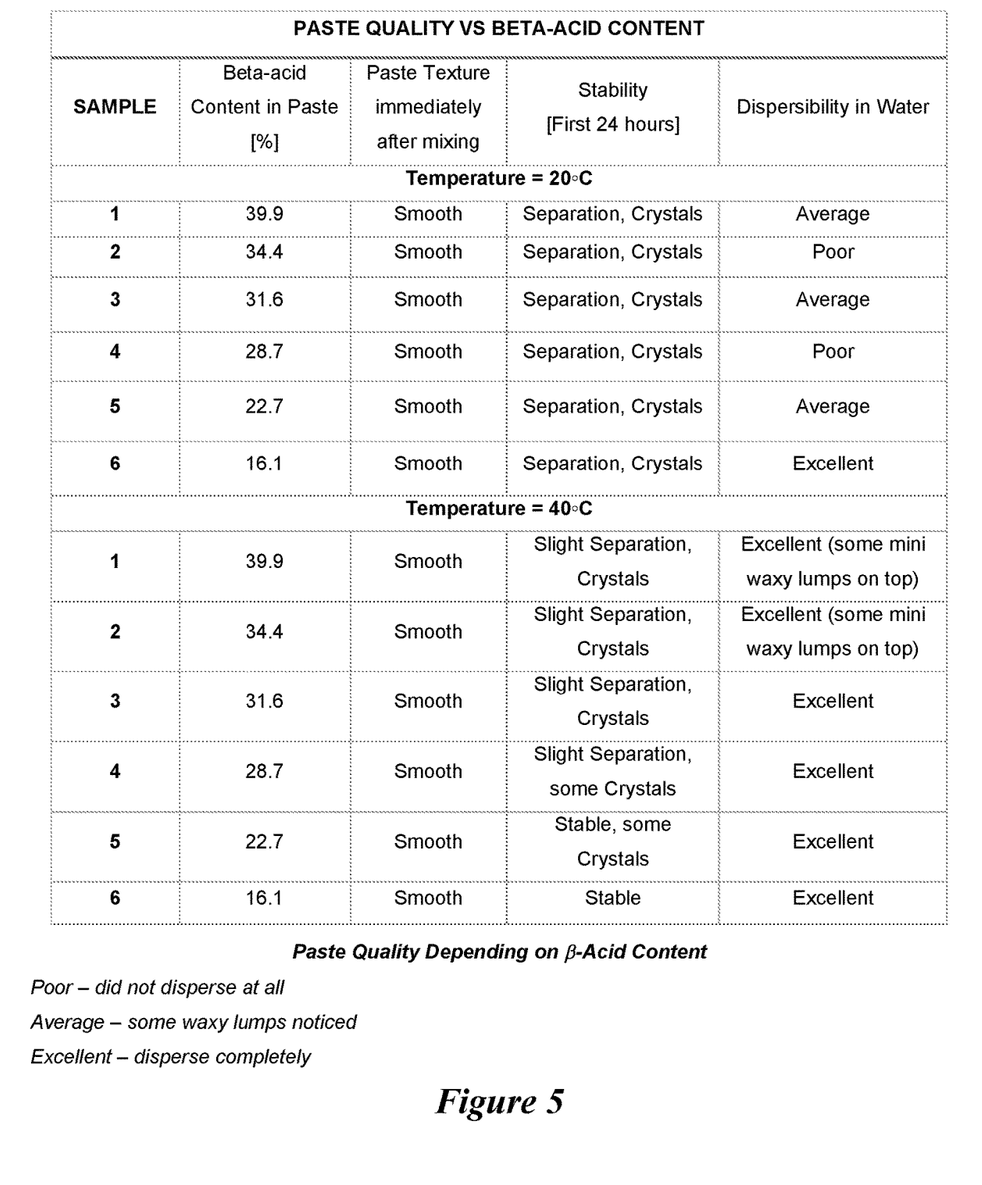
FIG. 5 shows Table 6, which contains the results for Citra pastes containing a range of different concentrations of β-acids.

Citra pastes containing a range of different concentrations of β-acids were prepared and monitored in terms of physical stability and dispersibility in water (FIG. 5; Table 6). Oil content was constant for all the samples 7% w/w. The ratio between polar extract and ORE was 70:30. Two temperatures (20° C. and 40° C.) were tested for the mixing process.

Results:

It was observed (Table 6) that the concentration of β-acids had a significant impact on paste stability and paste dispersibility in water. The higher the concentration, the poorer the stability of the paste and the higher amount of crystals found in the sample. However, paste stability could be notably improved by heating up the ingredients up to above 35° C. before blending/mixing together. Heating to improve mixing and subsequent stability did not have any noticeable impact on subsequent use of the pastes.

Consequently, for further studies, we heated both the aqueous extract (hot water extract) and the oil-containing components to 35° C., or more. The two components were mixed by stirring the aqueous extract and slowly adding the oil-containing component, followed by stirring over ten minutes.

As a result of these preparative steps, we determined that preferably the amount (by weight) of the aqueous extract preferably generally equals or exceeds that of the oil-containing component in order to produce a homogeneous paste with dispersibility in water.

The precise ratio of aqueous extract to oil-containing component varies from sample to sample, principally depending upon the oil and δ-acid content of the oil-containing component as well as varying with the hop variety. Generally, the higher the oil content of the oil component, the lower the proportion of oil-containing component in the final paste. We also found that high β-acid content oil-containing components required heating to higher temperatures to ensure mixing to a homogeneous paste. There is also some variation with water content of the polar extract.

Accordingly, preferably the ratio of the polar extract to the oil-containing component is equal to or above 1:1; preferably 60:40 as above; more preferably 70:30 or above.

Inventive Example 14

Water Content of Aqueous Extract

Figure 1:
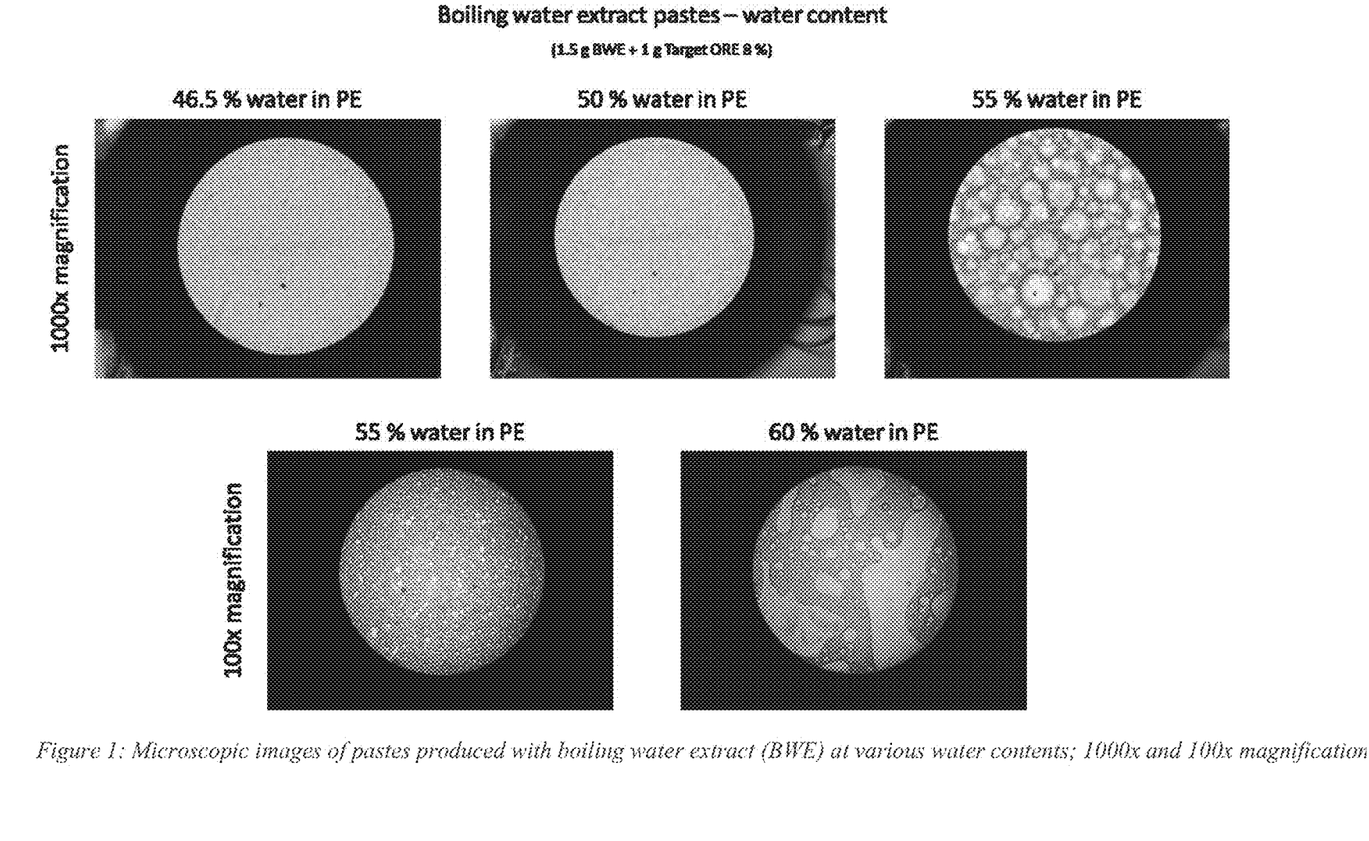
FIG. 1 shows microscopic images of pastes produced with polar extracts (PE) possessing different water contents; 1000× and 100× magnification.

The impact of the water content of the aqueous extract on its emulsifying properties/miscibility with $CO_2$ extract was examined using an extract with a water content of 46.5% w/w. For small amounts of extract, the water content was adjusted to 50, 55, and 60% w/w and the extracts were mixed with Target $CO_2$ extract (8% w/w oil) at a ratio of 3:2 to produce a paste. The resulting pastes were examined under the microscope at 1000× and/or 100× magnification. At 46.5% w/w and 50% w/w water content, the polar extract formed smooth pastes with the $CO_2$ extract with very small, homogenous droplets. At 55 and 60% water content, phase separation was observed and oily droplets formed that increased in size as the water content increased. Microscopic images for the four pastes are given in FIG. 1.

Similar experiments were performed using a high-oil Mosaic extract (20.6% oil). Initially, the aqueous extract was mixed with the oil rich extract (ORE) at a ratio of 3:1. More ORE was then added slowly up to a ratio of 1:1. The resulting paste was smooth, paler than the aqueous extract itself and rather mustard-like. As the ORE content was increased, the paste became thicker. The water content was then adjusted to 50% in the final paste. The resulting paste was liquid, but still smooth, with a mustard-like colour and texture. It was stored for three weeks and showed very little separation. The few small, dark droplets formed could be easily eliminated by shaking.

Overall, the experiments showed that a maximum water content for the aqueous extract prior to combination with the hop-oil containing component of about 55 wt % is important for paste production and stability. When using high-oil extracts, the rate of addition also has an impact on miscibility and the ORE needs to be added slowly to ensure full emulsification. Once a stable paste is made up, water can be added to improve the consistency (making dosing easier).

Inventive Example 15

Comparison of Time of Paste Addition During Brewing Process (Laboratory Scale)

Investigation of the influence of the point of addition during brewing on the final flavour and aroma of the beer was carried out. Fermentation trials were set up to investigate three different times of addition (start of fermentation, start of maturation and end-of maturation) using the following hop paste products:

1) $CO_2$ ORE Citra Paste (5.2% oil content)
2) $CO_2$ ORE El Dorado Paste (3.8% oil content)
3) $CO_2$ Aurora Paste (4.0% oil content)
4) $CO_2$ ORE Cascade Paste (3.2% oil content)
5) Oil Equinox Paste (14% oil content).

All the ORE pastes were made in accordance with Inventive Example 8 and hop oil paste in accordance with Inventive Example 12 (sample 8).

Fermentation:

All equipment (e.g. beakers, spatulas, flasks) used during fermentation were sterilised with boiling water and then with 70% ethanol. 495 g of Amber Malt Extract (Thomas Coopers) was placed in a 5 L glass beaker and mixed with 3 L of boiling water. The mixture was stirred manually until all the extract was dissolved and allowed to cool slowly to 30° C. before 0.45 g of Iso-hop (Barth Haas UK) and 0.216 g of yeast aid powder (Brupaks Yeast-Vit nutrient) were added. All ingredients were stirred together for 10 min using a magnetic stirrer. When the temperature of the solution reached a yeast slurry (3.18 g of dried yeast Safbrew T-58, Fermentis in 300 ml of water t=30° C.) was added. All ingredients were stirred using a magnetic stirrer for 3 min and then divided between 11 beakers (300 ml aliquots in each) for fermentation. Samples were kept at ambient temperature (17-19° C.) for 3 days. After 3 days the yeast was separated from the 'green beer' and the beakers were then placed in a fridge at 5° C. for a further 3 days (maturation). At the end of maturation, all beers were treated with Isinglass (approx. 0.3%) and held at 5° C. for a further 24 h. The beers were then tasted and the clarity measured (Hach 2100N Turbidimeter, 90° C.). The same brewing conditions were applied for all the samples investigated. Results from taste assessments are presented in Table 7 below.

TABLE 7

Sensory evaluation of beer samples treated with paste and dosed at three different times during the fermentation process.

| Sample | Time of addition | Sensory evaluation |
|---|---|---|
| Control | N/A | Beer-like, bitter |
| ORE Citra Paste | Start of Fermentation | Fruity, very soft, passion fruit, floral, balanced, peach, mouthfeel |
| ORE Citra Paste | Start of Maturation | Fruity, passion fruit, sharp, dry |
| ORE Citra Paste | Maturation | Fruity, sharp, hoppy, resinous mouthfeel |
| ORE El Dorado Paste | Start of Fermentation | Flora, rose-like, hoppy, balanced |
| ORE El Dorado Paste | Start of Maturation | Floral, hoppy, vegetal |
| ORE El Dorado Paste | Maturation | Hoppy, herbal |
| ORE Aurora Paste | Start of Fermentation | Lager-like, nutty, fruity, cherry-like, |
| ORE Aurora Paste | Start of Maturation | Fruity, fresh, citrusy, bitter, mouthfeel, |
| ORE Aurora Paste | Maturation | Very intense flavour, fruity, resinous, nectarine, passion fruit-like |
| ORE Cascade Paste | Start of Fermentation | Hoppy, herbal, smooth |
| ORE Cascade Paste | Start of Maturation | Hoppy, herbal, smooth, balanced |
| ORE Cascade Paste | End of Maturation | Intense hoppy, resinous, hoppy |
| Oil Equinox Paste | Start of Fermentation | Sweet, floral, tea-like (bergamot) |
| Oil Equinox Paste | Start of Maturation | Sweet, floral, fruity, bitter, citrusy, hoppy |
| Oil Equinox Paste | End of Maturation | Very intense, hoppy, bitter, citrusy, resinous |

There is a correlation between addition time during the brewing process and the final flavour and aroma of the beer. When paste is added during fermentation it gives a complex, rich and balanced flavour, particularly fruity and floral, dependent on the variety. When added after fermentation mainly hoppy, herbal notes appear. When added at the end of maturation strong hoppy and resinous notes are detected.

We had observed that addition of the paste to the final beer, at the end of maturation or post-maturation, can cause the beer to become hazy. However, we found that when the paste is added earlier in the process, before or after fermentation or during early maturation, the resulting beer is less hazy and can be visually bright.

We also examined the effect of filtration of the beers using 3, 1.2, and 0.45 micron filters and again evaluated the beers in terms of flavour and clarity. The results are shown in Table 8.

TABLE 8

Effect of filtration

| Sample | Haze EBC at 20° C. (before filtration) | Sensory evaluation | | | |
|---|---|---|---|---|---|
| | | No filtration (as Table 4) | 3 microns | 1.2 microns | 0.45 microns |
| Control | 3.10 | Beer-like, bitter | Beer-like, bitter | Beer-like, bitter | Beer-like, bitter |
| ORE Citra Paste at start of fermentation | 3.22 | Fruity, very soft, passion fruit, floral, balanced, peach, mouthfeel | Hoppy, fruity, passion fruit like | Hoppy, fruity, passion fruit like | Control like, mouthfeel, fruity |
| ORE Citra Paste at start of maturation | 2.89 | Fruity, passion fruit, sharp, dry | Bitter, hoppy, mouthfeel, fruity | Bitter, hoppy, mouthfeel, similar to control | Control-like, bitter |
| ORE Citra Paste at end of maturation | 4.33 | Fruity, sharp, hoppy, resinous mouthfeel | Very bitter, dry, mouthfeel, fruity | Very bitter, dry, mouthfeel, feel | Control-like, mouthfeel, fruity |

Initial haze is similar to the control for earlier additions of paste but starts to increase for later additions at the end of maturation. Haze of all beers were very similar after filtration regardless of dosing point.

In general, the earlier the addition of paste in the brewing process the fruitier and more floral the flavour achieved and with good beer clarity. Hence less loss of flavour during filtration. It also appears that flavour survives filtration better when the paste is added earlier in the brewing process.

Inventive Example 16

Foam Enhancement

During the filtration experiment of Inventive Example 15 above, we noticed that the beers dosed with paste at the start of fermentation showed enhanced foam properties to the those dosed later and the control beer. The foam appeared to be more creamy and more stable.

This was verified in a small brewing trial in which beer was dosed as described above with Citra paste at the start of fermentation. Further beer samples were dosed with an equivalent amount of polar extract at the start of fermentation, at the start of maturation, and at the end of maturation. The foam properties of all beers were assessed using an Alka-Seltzer® test as described below. Tetrahop, a hop-derived foam enhancer, dosed at 4 ppm, was used as a positive control; and untreated beer was used as a negative control. 200 ml of each beer sample were poured onto an Alka Seltzer tablet (a pharmaceutical product that consistently and reproducibly releases a fixed volume of carbon dioxide when contacted with liquid (beer)) at the bottom of a 500 ml measuring cylinder and the time from pouring to collapsing of the foam (surface of the beer becomes visible) was measured. The results can be found in Table 9. Both addition of paste or pure polar extract early in the brewing process shows improved foam stability.

TABLE 9

Foam enhancement

| Beer sample | Improvement (compared with control) |
|---|---|
| Tetrahop (replication 1 added at start of fermentation) | 37% |
| Tetrahop (replication 2 added at start of fermentation) | 38% |

TABLE 9-continued

Foam enhancement

| Beer sample | Improvement (compared with control) |
| --- | --- |
| Citra paste (replication 1 added at start of fermentation) | 15% |
| Citra paste (replication 2 added at start of fermentation) | 21% |
| Polar extract added at start of fermentation | 53% |
| Polar extract added at maturation | 24% |
| Polar extract added at end (to final beer) | 2% |

Inventive Example 17

$CO_2$ Target Paste Versus Target Pellets (Standard Dry Hopping)

Figure 6:
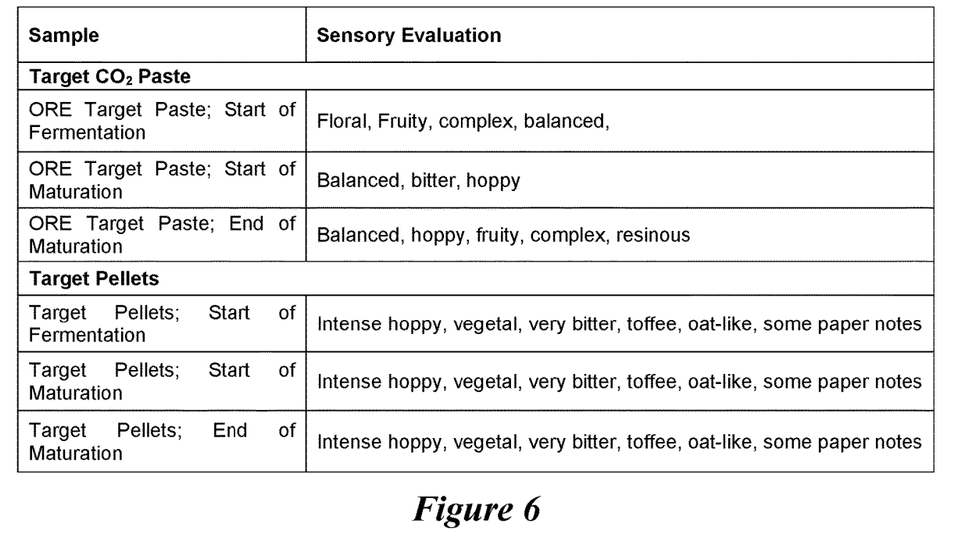
FIG. 6 shows Table 10, which contains the results of a sensory evaluation of beer samples treated with paste and pellets, and dosed at three different times during the fermentation process.

A comparative experiment was performed for Target pellets (0.8% oil) and Target paste (10% oil). Both hop products (1 g of pellets, 0.08 g of paste both equivalent to 26 ppm of oil in beer) were added at the start of fermentation, start of maturation and at the end of maturation and then evaluated in terms of flavour and aroma. The results are shown in Table 10 (FIG. 6).

There are differences in flavour between beers treated with paste and those treated with pellets. Pellets delivered intense hoppy and vegetal flavour with toffee and oat-like notes, characteristic for a raw Target hops. Additionally, some paper-like notes were detected in all beers brewed with hop pellets. Samples treated with paste were preferred over pellets delivering complex, balanced flavours. Depending on the addition time different notes were detected with more floral, fruity notes being prevalent when the paste was added at the start of fermentation to hoppy, resinous flavours for later additions.

Inventive Example 18

Comparison of Time of Paste Addition During Brewing Process (20 Litre Scale)

Brewing trials with addition of Citra Paste were carried out in the 20 L brewery in the offices of Joh. Barth & Sohn, in Nuremberg. Paste was added in the fermenter at two dose rates (equivalent to 14 ppm, 28 ppm oil), and at two different times: start of fermentation and at the start of maturation.

Brewing Details:

Weyermann Bavarian Pilsner malt extract was used.

4 kg were solved in 22 L water to achieve an original gravity of 12° Plato

A bitterness of 20 IBUs was achieved by dosing Isohop during wort boiling.

Three brews of 20 L each were made:

Trial 1: Control

Trial 2: Treatment at start of fermentation

Trial 3: Treatment at start of maturation

For sterilisation, the wort was boiled for 20 min. Precipitated proteins were separated by using whirlpool technique, with no hop addition in whirlpool, followed by a rest for 20 min. The wort was fermented at 24° C. for six days with Fermentis Safale US 05 yeast strain.

Trial 1—Fermentation was carried out over 6 days followed by maturation at <5° C. for a further 6 days. The beer was then transferred into bottles and conditioned for two weeks at ambient temperature and then for a minimum of two weeks at <5° C.

Trial 2—The wort (20 L) was divided into two portions (10 L each) and dry hopped by pre-mixing the paste (at two dose levels) in a small amount of wort and adding the mixed paste during wort aeration (rapid manual stirring) prior to pitching of yeast. Fermentation was carried out over 6 days followed by maturation at <5° C. for a further 6 days. The beer was then transferred into bottles and conditioned for two weeks at ambient temperature and then for a minimum of two weeks at <5° C.

Low dosage: 2.5 g paste/litre (fermentation/maturation) ≡14 ppm of oil

High dosage: 5.0 g paste/litre (fermentation/maturation) ≡28 ppm of oil

Trial 3—Fermentation was carried out over 6 days. The green beer (20 L) was divided into two lots (10 L each) and the paste was pre-mixed (at two dose levels) in a small amount of green beer before being added back into the remainder of the green beer. Another fermenter was used for maturation of the beer for six days at <5° C. prior to bottling, conditioning for two weeks at ambient temperature and then for a minimum of two weeks at <5° C.

Low dosage: 2.5 g paste/litre (fermentation/maturation) ≡14 ppm of oil

High dosage: 5.0 g paste/litre (fermentation/maturation) ≡28 ppm of oil

Figure 7:
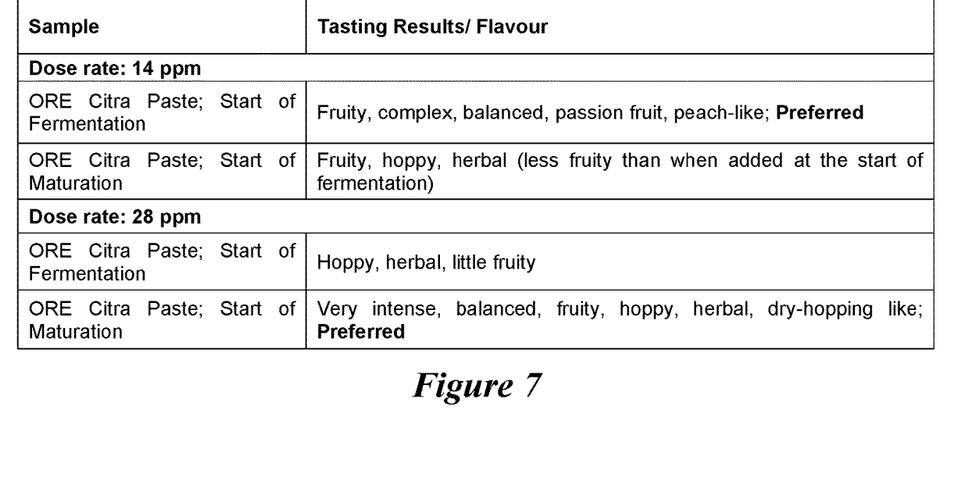
FIG. 7 shows Table 11, which contains the results of a sensory evaluation of beer samples treated with Citra paste and dosed at two dose rates and two different times during the fermentation/maturation process.

Sensory evaluation showed that all treatments with the paste produced 'bright' beers that exhibited a significant and positive flavour impact. The results are shown in Table 11 (FIG. 7).

After maturation, all the beers were visually 'bright' with an intense hop aroma and taste. No distinctive preference was noted with some tasters expressing a personal preference for fermenter additions whilst others preferred the beers dose at the start of maturation. Other than expressing that personal preference, no tasters expressed a preference for the control.

We then conducted further experiments to seek to optimise conditions for the preparation of our inventive pastes and investigate further the effects of using the pastes compared with the use of pellets in the flavouring of beer.

Inventive Example 19

Brewing Trial—Timing of Paste Addition

A light lager beer was dosed with paste made from three different hop varieties at two stages of the brewing process—at the start of fermentation (FV) and at the start of maturation (MV). Half of the beer was filtered before bottling; the other half was bottled unfiltered. The pastes were formed by mixing an aqueous extract containing 40 wt % water with an oil rich extract (ORE) in a ratio of 70:30 to giving a final equivalent of 25 ppm of hop oil. Experiments were carried out at the research brewery in Train-St. Johann.

Results:

All beers were tested organoleptically and the results are summarised in Table 12 and Table 13.

TABLE 12

Tasting results for beers dosed with Citra paste.

| Sample | Aroma | Flavour |
| --- | --- | --- |
| Citra 2 Fermentation Filtered | Passion fruit, citrus, nectarine, fruity, intense, beautifully balanced, floral—excellent [delivered typical Citra hops character] | Passion fruit, fresh, citrus, peach, fruity, intense, beautifully balanced, pleasant aftertaste |
| Citra 2 Maturation Filtered | Hoppy, little resinous, sweet, passion fruit, nectarine—very good | Fruity, sweet, little spicy, pleasant bitterness, some sweet resinous notes, balanced, more resinous than fermentation sample |
| Citra 2 Fermentation Unfiltered | More intense then FV and MV filtered, lost fruity character, less citrus [overdosed] | More intense than FV and MV filtered, lost fruity character [overdosed], bitter |

TABLE 13

Tasting results for beers dosed with Ella and Mosaic pastes.

| Sample | Aroma | Flavour |
| --- | --- | --- |
| Mosaic Fermentation Filtered | Fruity, nectarine, peach, little hoppy, vegetal, citrus, herbal, fresh—excellent | Peach, nectarine, fresh, dry, balanced, herbal, vegetal, hoppy, very pleasant mouthfeel |
| Mosaic Maturation Filtered | Fruity, sweet, passionfruit, citrus, grapefruit, herbal, vegetal, some sweet off notes | Dry, hoppy, herbal, nectarine, peach, pleasant |
| Mosaic Fermentation Unfiltered | Fruity, grapefruit, passionfruit, citrus, fresh, hoppy, herbal | Fruity, grapefruit, passion fruit, citrus, fresh, dry, mouthfeel, bitter—very pleasant |
| Ella Fermentation Filtered | Nectarine, peach, passion fruit, hoppy, citrus, grapefruit, less intense than Mosaic fermentation | Fruity, soft fruits, nectarine, peach, herbal, hoppy, very pleasant |
| Ella Maturation Filtered | Fruity, sweet, resinous, sweet, herbal vanilla, some cheesy notes, less intense than Mosaic maturation | Fruity, fresh, hoppy, herbal, balanced, herbal peach, nectarine |
| Ella Fermentation Unfiltered | Less fruity then filtered sample, some grassy notes still very fruity, herbal, vegetal, passion fruit like | Less fruity then filtered sample, some grassy notes, herbal, vegetal, still very fruity, passion fruit like, more mouthfeel, more bitter |

Conclusions

When paste added into FV—more balanced, sweet, fruity character, compared with when paste added into MV, and when fewer less fruity, some resinous notes appear Citra—excellent results for both trials Mosaic versus Ella—both very good, Mosaic more intense, excellent flavour Filtration—filtered samples deliver more fruity character than unfiltered samples. However, unfiltered samples are more bitter, vegetal with a pleasant mouthfeel Unfiltered samples—lost fruity character in comparison with the filtered samples, still positive. 40% of the panellists preferred unfiltered samples.

Figure 2:
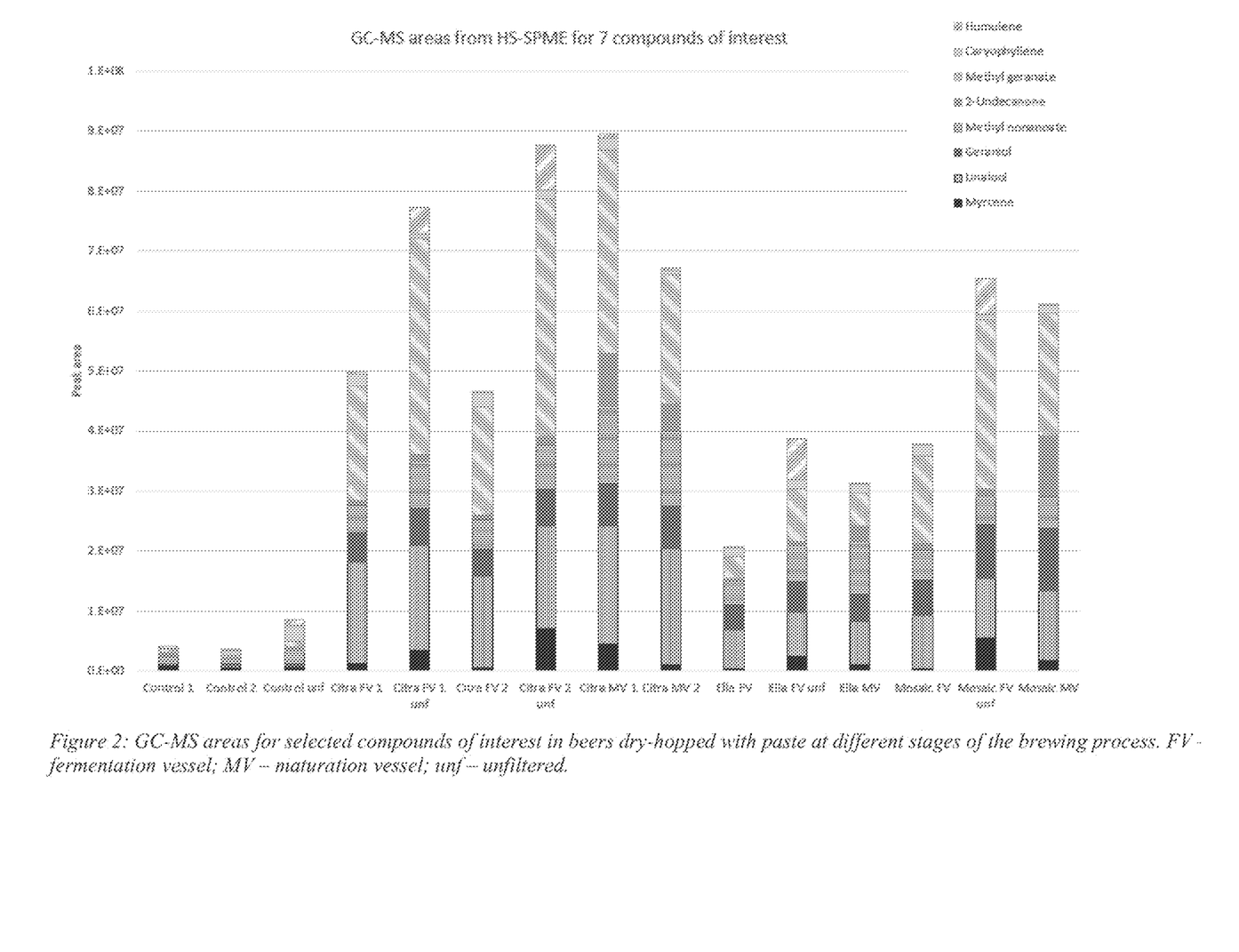
FIG. 2 is a histogram showing the GC-MS areas for selected compounds of interest in beers dry-hopped with paste at different stages of the brewing process. "FV" stands for fermentation vessel; "MV" stands for maturation vessel; "unf" stands for unfiltered.

All trial beers were analysed by SPME-GC-MS. The results are summarised in FIG. 2. The SPME confirmed the intensity perception from the tasting—filtered beers were weaker than unfiltered beers, beers dosed with paste during fermentation were weaker than those dosed during maturation. Mosaic beers showed lower level of the compounds of interest than Citra beers and levels were lowest in beers dosed with Ella extract. The impact of filtration varied for different compounds and seemed to be particularly high for linalool and humulene.

Inventive Example 20

Dry Hopping—Paste Versus Pellets

In order to determine the advantage of dry hopping with paste over dry hopping with pellets a brewing trial on a pilot scale was carried out on site at Barth-Haas UK in Paddock Wood. The base beer was a pale ale. Citra pellets and Citra paste were added at two different stages of the brewing process (during fermentation and during maturation). The amount of paste and pellets added into the beer was recalculated on the oil content (25 ppm, each sample). Fermentation took 1 week and maturation 2 weeks (3 weeks all together). 1 L of each sample was collected and investigated in terms of flavour, HS-SPME profile, haze, ethanol content (GC) and utilization (yeast slurry). The rest of the beer was transferred into bottles, sparked with sugar (2 g per bottle), sealed and then left to for one week to settle. Utilisation of key aroma compounds (by HS-SPME-MS), impact on bitter compound concentration, handling and final flavour of the beer were investigated. A second trial using lager as a base beer was performed and these samples were also analysed by HS-SPME GC-MS to investigate utilisation.

Results:

Sensory evaluation did not show significant differences between pellets and paste. All samples delivered fruity, passion fruit-like flavour and aroma.

The alcohol content was comparable for all the samples (approx. 6.5%). It appeared that paste did not affect performance of the yeast.

The resultant yeast slurry was measured for all the samples by collecting the sediment from the kegs and letting them settle in the beakers (2 days). The assessment was made on a qualitative rather than accurate quantitative basis, but it showed that the collected sediment for pellets was significantly higher than for paste (250 ml of sediment for the paste treated beer and 450 ml for the pellet-treated beer, following maturation), demonstrating lower beer losses when using the inventive pastes.

Figure 3:
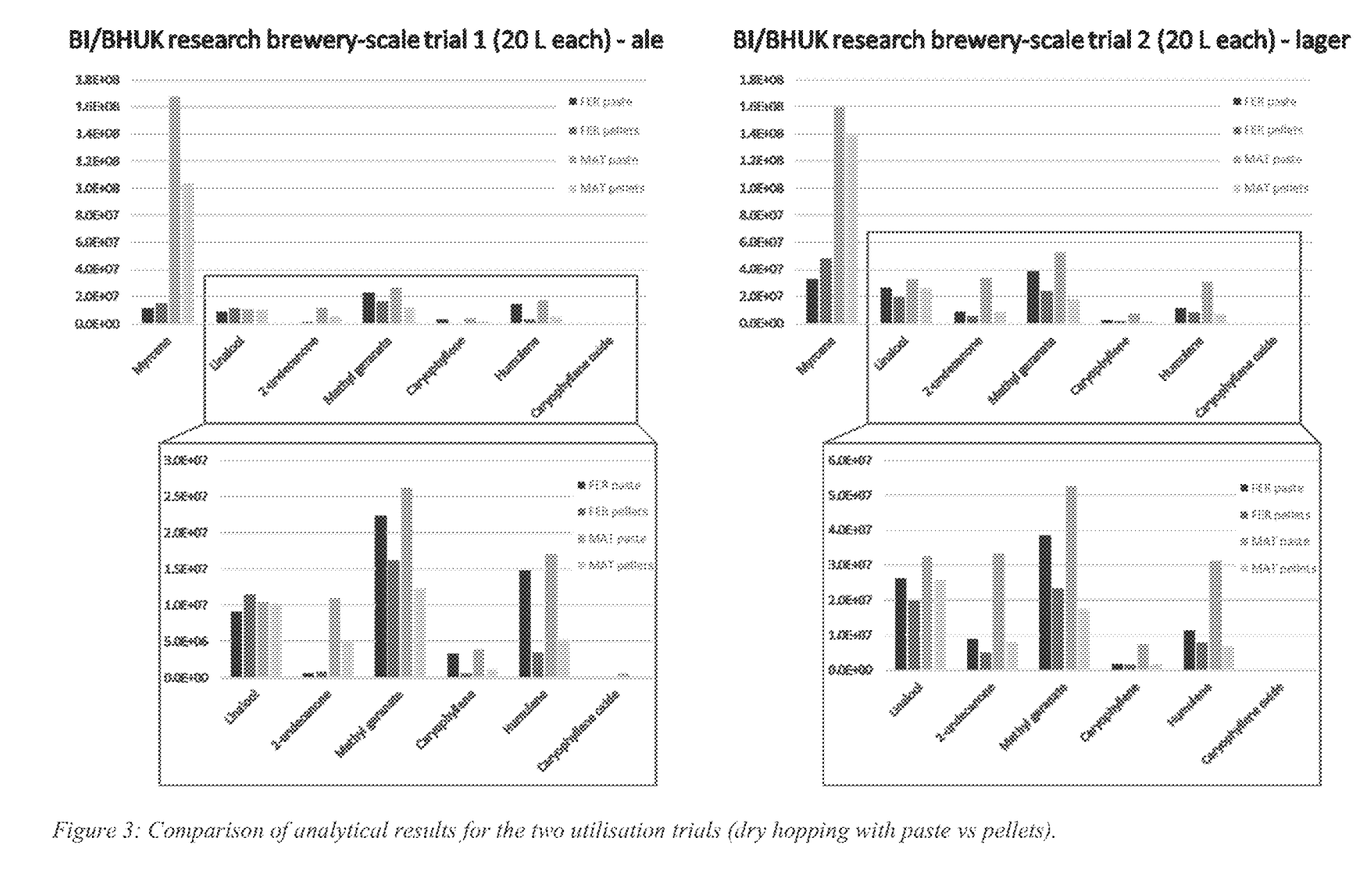
FIG. 3 shows a series of histograms, which provide a comparison of analytical results for the two utilisation trials (dry hopping with paste vs. pellets). "L" stands for linalool; "2-UD" stands for 2-undecanone; "MG" stands for methyl geranate; "C" stands for caryophyllene; "H" stands for humulene; "CO" stands for caryophyllene oxide; "FER" stands for fermentation; "MAT" stands for maturation.

Key aroma compounds were analysed in all beers using HS-SPME-GC-MS. Almost all compounds showed higher concentrations in the paste-dosed beer compared to the pellet-dosed beers and this effect was more pronounced for maturation addition than for fermentation addition (see FIG. 3).

The samples from both trials were also analysed for iso-$\alpha$-acids, as losses of iso acids through dry-hopping have been reported in the literature (https://www.hopsteiner.com/wp-content/uploads/2016/03/2015-06_TS_Humulinone-Utilization.pdf). Iso-$\beta$-acids are the principle source of bitterness in beers. This effect was confirmed in both trials and it was found to be substantially less pronounced for paste (loss of 4-5% on average) compared to pellets (loss of 10 to 17%) (see Table 14).

TABLE 14

Reduction in iso-α-acid concentration in dry-hopped beers compared to control beers.

| | Reduction in iso-α-acid concentration compared to control |
|---|---|
| Paste Fermentation | 5% |
| Paste Maturation | 4% |
| Pellets Fermentation | 17% |
| Pellets Maturation | 10% |

In assessing the effect of the pastes on the beer, the following observations were made.

When added directly into the final beer:

As a general observation, beer treated with paste has a very complex, hoppy, herbal and vegetal flavour with a characteristic mouthfeel. Depending on the hop variety used, fruity, citrusy and floral notes might appear.

Paste based on $CO_2$ oil rich extract gives a very rich, balanced and complex flavour, closer to dry-hopped beers than any other hop-derived extracts.

Paste based on hop oil/hop oil fraction delivers a very intense, hop oil-like aroma and a complex flavour with some mouthfeel and soft bitterness (floral, hoppy, and balanced).

Some flavour will be lost depending on the filtration regime used to remove haze arising from addition of hop products.

When added during the brewing process

There is a correlation between addition time during brewing process and the final flavour and aroma of the beer. When paste is added during fermentation it gives very complex, rich and balanced flavour (fruity, floral— depending on the variety). When added after fermentation mainly hoppy, herbal notes appear. When added at the end of maturation strong, hoppy, resinous notes are detected.

Earlier addition produce a beer with good clarity.

Losses of flavour due to filtration are less significant with earlier addition of the paste.

Our hop emulsions and pastes are surprisingly effective in terms of delivering complex and pleasant hop flavour and aroma which are characteristic of the hop variety used.

Accordingly, the hop emulsions of the present invention are superior to conventional products and disperse in beer as readily as conventional emulsions, providing excellent flavouring, in a naturally-based product. Additionally, empirical trials have shown that the presence of the polar (aqueous) extract, being a hop extract, delivers a more complex flavour and aftertaste to the beer, substantially true-to-type with traditional dry hopping, whilst still retaining the ease of use advantages of conventional hop emulsions.

Unexpectedly, aqueous extracts contain natural emulsifying agents which allow omission of synthetic, food grade emulsifiers, although an acceptable thickening agent may still be included.

Most surprisingly, we have been able to develop a purely hop-derived paste which, unexpectedly, is readily dispersible in cold wort and in beer and which can add excellent hop flavour without the need for solvent carriers, thickeners or emulsifiers.

Additionally, as the inventive emulsions and pastes are an extract of hops, beer losses which are typically incurred due to adsorption onto cellulose particles when dry hopping with hop cones or pellets (typically 15% in brewing of Craft beers) are minimal.

The invention claimed is:

1. A hop paste comprising a mixture of an aqueous extract of hops h;aving a water content between 20% w/w and 50% w/w and a hop oil-containing component; wherein the hop paste is dispersible in cold wort, beer, or other beverages.

2. The hop paste as claimed in claim 1, wherein the aqueous extract of hops consists of an extract directly obtained by extracting hops or spent hops with water.

3. The hop paste as claimed in claim 1, wherein the aqueous extract of hops is a de-solventized extract directly obtained from a hop extraction process with a lower alcohol that is selected from methanol, ethanol, and isopropanol.

4. The hop paste as claimed in claim 1, wherein the hop oil-containing component is a mixture of hop oils or an extract of hops.

5. The hop paste as claimed in claim 1, wherein the aqueous extract of hops and the hop oil-containing component are in a ratio of at least 1:1.

6. The hop paste as claimed in claim 1, wherein the water content of the aqueous extract of hops is between 20% w/w and 40% w/w.

7. The hop paste as claimed in claim 2, wherein the aqueous extract of hops is obtainable by extracting hops or spent hops with hot water; wherein the hot water is from 50° C. to boiling.

8. The hop paste as claimed in claim 5, wherein the lower alcohol is ethanol.

9. The hop paste as claimed in claim 5, wherein the aqueous extract of hops and the hop oil-containing component are in a ratio of at least 3:2.

10. The hop paste as claimed in claim 5, wherein the aqueous extract of hops and the hop oil-containing component are in a ratio of about 7:3.

11. The hop paste as claimed in claim 6, wherein the water content of the aqueous extract of hops is between 25% w/w and 35% w/w.

12. The hop paste as claimed in claim 1, wherein the aqueous extract of hops is an aqueous extract of hops obtainable directly obtained-by extracting hops with water, hot water, or boiling water.

13. The hop paste as claimed in claim 1, wherein the aqueous extract of hops is obtained from an ethanolic hop extraction process.

14. The hop paste as claimed in claim 1, which is formulated as a binary paste consisting of (i) the aqueous extract of hops having a water content between 20% w/w and 50% w/w and (ii) the hop oil-containing component.

15. The hop paste as claimed in claim 4, wherein the extract of hops is an oil-rich extract of hops.

* * * * *